June 22, 1954  P. E. FISCHER ET AL  2,681,722
ROTARY TRANSFER CONVEYER
Filed June 10, 1948

INVENTORS
PAUL E FISCHER
MORTIMER B. STURDEVANT
DONALD F. THOMAS
BY *William C. Babcock* ATTORNEY Patented June 22, 1954

2,681,722

UNITED STATES PATENT OFFICE 2,681,722

ROTARY TRANSFER CONVEYER

Paul E. Fischer, Mortimer B. Sturdevant, and Donald F. Thomas, Minneapolis, Minn., assignors to General Mills, Inc., a corporation of Delaware Application June 10, 1948, Serial No. 32,196

11 Claims. (Cl. 198—25)

This application relates to rotary transfer conveyors and more particularly to conveyors suitable for shifting rectangular containers from one line to another without change in their relative orientation with respect to their direction of movement.

Transfer conveyors have been proposed for use with rectangular containers in which the effective pusher arm of the transfer conveyor operates at substantially right angles to the direction of movement of the initial line of containers. In such conveyors the container itself will be changed in its relative orientation with respect to its direction of movement after it has been moved laterally from the first line and then onto a second line in a new direction. There are cases, however, in which it is desirable to preserve the initial relative orientation of the containers, so that a given side of the container remains in the desired position for subsequent operations as, for example, filling, labelling, sealing, or the like.

It is accordingly one object of the present invention to provide a transfer conveyor for operation with rectangular containers, which will not change the relative orientation of the containers.

A further object of the invention is the provision of a conveyor of this type suitable for high speed operation.

Another object is the provision of a rotary transfer conveyor having a pusher arm which crosses the initial line of containers at an angle of substantially 45°.

Still another object of the invention is to provide a conveyor of this type with means for initial partial rotation of the first container to facilitate insertion of a suitable pusher arm behind the container.

Other objects and advantages will be apparent from the following specification in which a preferred embodiment of the invention is described.

Figure 1:
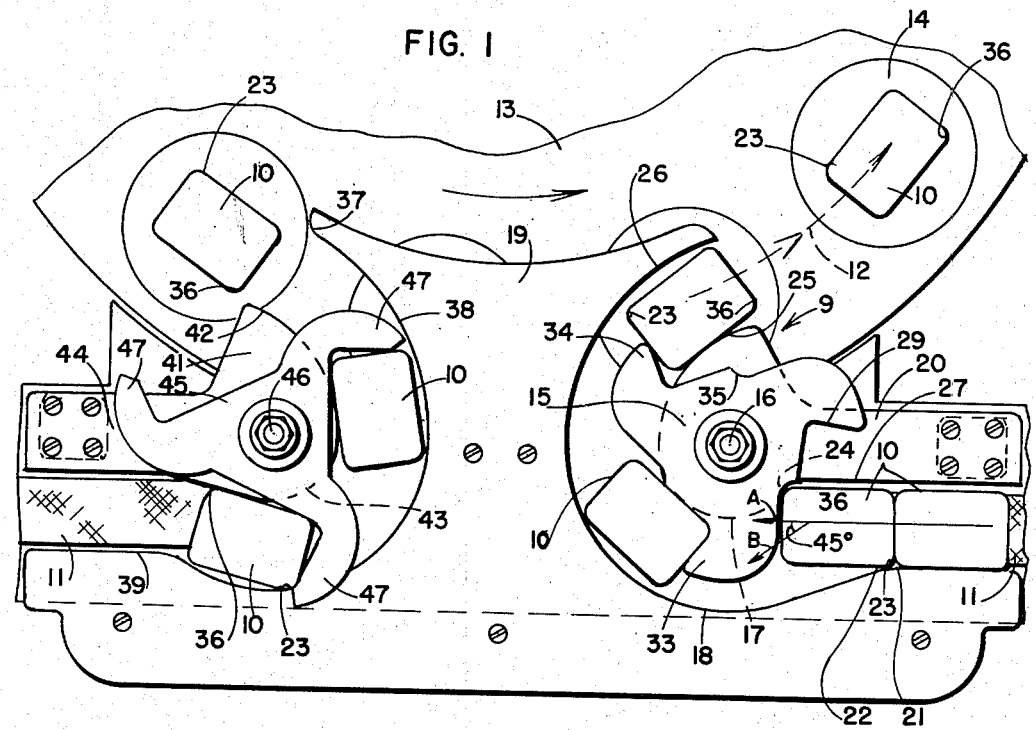
Figure 2:
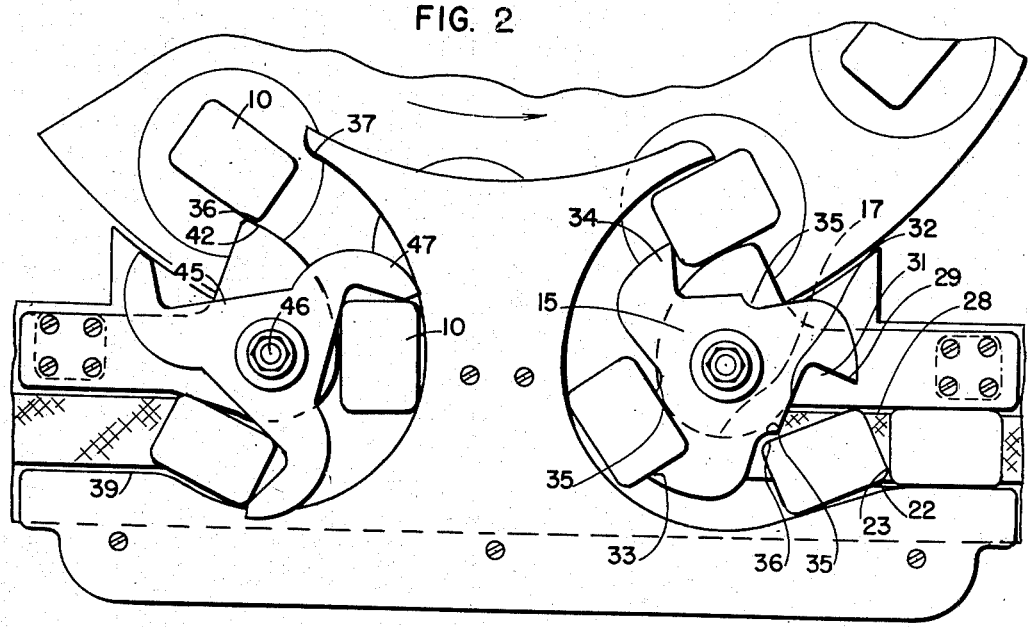

In the drawings which form a part of this specification, Figure 1 is a top view of a transfer conveyor suitable for shifting containers from a first straight conveyor line to a second rotary conveyor line, and Fig. 2 is a similar view showing the parts in a different operative position.

As indicated in the drawings, the rotary transfer conveyor, designated generally at 9, is positioned to shift containers 10 from a first conveyor line 11 into a rotary conveyor line designated by the dotted arrow 12. The first conveyor may be a straight line belt type conveyor of known construction in which the belt 11 is driven constantly from right to left in the drawings in order to maintain a supply of containers 10 against the transfer conveyor itself. Suitable safety devices may be provided in known manner to stop the operation of the transfer conveyor in the event that no containers 10 are present at this point.

The second line of containers indicated at 12 may be carried by a rotary turntable 13 which in turn has suitable supporting plates or stations 14 for the individual containers 10. Turntable 13 may be part of a filling, capping, or labelling machine which is adapted to perform a desired operation in connection with containers 10.

The transfer conveyor itself includes a transfer member 15 which is rotatably mounted on an axis indicated at 16. Inner and outer guides, 17 and 18 respectively, form a channel or guideway which facilitates the transfer of the containers 10 from the initial conveyor line 11 to the second container or conveyor line 12. The intermediate portions of guides 17 and 18 are substantially concentric with the axis of rotation 16 of the transfer member 15. Outer guide 18 may be formed by one edge of a plate member 19 which also serves as a guide member for a further conveyor described below. A portion 21 of this plate 19 is also located adjacent the outer edge of the first conveyor line 11 in order to prevent lateral displacement of the containers 10 from the belt 11.

While the main intermediate portion of guide 18 is concentric with the axis of rotation 16 as described, the point 22 at which this outer guide 18 intersects the guide portion 21 for the first container line is located at a point substantially farther from the axis of rotation 16 than the remaining intermediate portions of the guide 18. In other words, the radial distance from axis 16 to point 23 is greater than the radial distance from axis 16 to the remaining intermediate portions of guide 18. It is preferred that this point of intersection 22 between the circular guide 18 and the first container line guide portion 21 should be located at a point substantially at the rear of the first container in the line of containers 10.

The inner guide 17 is similarly formed as one edge of a plate member 20. An edge 27 of plate 20 serves as the second or inner guide for the first straight line conveyor 11. The circular or concentric inner guide portion 17 meets this straight line guide portion 27 at a point 24.

In the preferred form of the invention, the location of axis 16 is offset laterally from the line of guide 27 so that the inner concentric guide portion 17 meets the straight guide portion 27 at point 24 in a relatively obtuse angle rather than as a substantial perpendicular to guide 27. This initial portion of inner guide 17 adjacent to point 24 thus cooperates with the portion 22 of the outer guide 18 to provide means for turning slightly the initial container from the position of Fig. 1 to the position of Fig. 2.

As a result of this initial turning movement of the first container 10, a small space 28 is provided between the first and second containers. The presence of this space facilitates the insertion of a pusher arm 29 on transfer member 15. Pusher arm 29 is accordingly permitted to locate itself behind the container 10 so as to push against what was originally the rear side or face of the container. Thus the relative orientation of the container with respect to its direction of movement through the transfer conveyor is preserved without change.

Pusher arm or surface 29 may constitute the rear wall of a container pocket, designated generally as 31 (Fig. 2). This container pocket 31 also includes an inner wall portion 32 for engagement with the adjacent inner side of the container 10.

Additional pusher arms 33 and 34 may be symmetrically located on the rotary transfer member 15.

Ahead of these pusher arms 29, 33, and 34 and their corresponding container pockets 31 shoulders 35 are provided. Each shoulder 35 is designed to assist in the initial turning of the first container in the line. Thus the shoulder 35 engages the near inner corner 36 or some portion of the adjacent side wall of the container, as indicated in Figs. 1 and 2, to push this corner of the container downwardly in the drawings and thus give a positive turning movement to the initial container, to supplement the turning tendency of the inner and outer guides 17 and 18. While it is possible to achieve the necessary turning movement of the initial container by the use of either the shoulders 35 or the cooperating guides 17 and 18, it is preferable to use the combination of the two devices, particularly in order to achieve relatively high speed operation.

The functions of these portions of the conveyor will be apparent. First of all the pressure exerted on the initial container 10 by the conveyor belt 11 forces the forward inner corner 36 of the container against the sloping initial portion of inner guide 17. Thus the inner guide exerts a camming action on this corner which tends to force it downwardly in the drawing or at a substantial angle to the initial container line. This turning action is facilitated because the outer guide 18 meets the straight guide portion 21 of the first container line at point 22 located near the rear opposite corner 23 of the container. Thus the outer guide 18 not only fails to obstruct the turning action of container 10 but the portion 22 actually serves as a fulcrum or pivot for the turning movement.

The camming action of the inner guide 17 is supplemented and made absolutely positive by the use of shoulders 35 on the rotary transfer member 15 as described. It has been found that a transfer conveyor embodying the characteristics and structure described above can be operated satisfactorily at a rate of 220 containers per minute.

The rotary transfer member 15 and particularly the pushers 29, 33, and 34 engage and move the containers 10 around through the path between guides 17 and 18 to a position above rotary turntable 13. The outer ends 25 and 26 of guide edges 17 and 18 may likewise be at a greater distance from the axis of rotation 16 of the transfer member 15 than are the intermediate portions of guides 17 and 18. Thus the containers 10 are pushed smoothly from the transfer conveyor onto the stations or plates 14 of turntable 13 for the next succeeding operation in container line 12. Because of the operation of the transfer conveyor 9 as described, the containers 10 will be oriented on the turntable 13 so that the respective corners 36 and 23 are in the same relative positions with respect to the direction of movement of the second container line indicated at 12 as these parts were in the initial line of containers.

The desired operations with respect to containers 10 take place during rotation of turntable 13. Containers 10 are ultimately removed from the turntable by engagement with further guide and transfer means to be described. Thus guide plate 19 has a projection 37 which constitutes the leading edge of an outer discharge guide 38. As the turntable 13 rotates, the containers 10 are moved against this outer guide 37—38 and are stripped by the guide away from the turntable and are then guided in a circular path back to a further line of containers carried by the initial conveyor belt 11. A portion 39 of plate 19 serves as an outer guide adjacent to the conveyor belt 11 so that a continuous outer guide is provided for the containers from the initial point of engagement at 37 through the intermediate outer guide portions 38 to the straight line guide portion 39.

A further plate 41 is provided with an initial inner guide portion designated at 42. Portion 42 merges smoothly with the intermediate inner guide edge 43 which finally terminates in a straight guide edge 44 for the opposite or inner side of conveyor belt 11. Thus the plates 19 and 41 provide a guide channel defined by a pair of guide edges for effective removal of the containers 10 from turntable 13 and retransfer of these containers to the initial conveyor belt 11.

This transfer of the containers is further effected by a rotary transfer member 45. Member 45 is rotatably mounted at 46 and includes pusher arms 47 symmetrically spaced on member 45 for engagement behind each of the containers 10.

Because the containers 10 are fed to the guides 37 and 42 in spaced relation, it is unnecessary for the transfer member 45 or the guides 37, 38, and 42, 43 to be provided with the turning means described in connection with transfer member 9. Therefore transfer conveyor 45 may be of a known type which is entirely orthodox in construction. Such a member, however, could not possibly function as a substitute for conveyor 9 for high speed transfer of containers in a situation where the containers are fed to it in contact with each other. In other words, where the initial line of containers includes containers which abut each other (for example, because they are fed against each other by the force of a conveyor belt such as belt 11), it is essential that an improved transfer conveyor designed according to the present invention as exemplified by conveyor 9 be employed, if high speed operation is to be achieved without change in relative orientation.

Minor variations in details of construction of the improved transfer conveyor 9 will be apparent to those persons skilled in this field. The invention is accordingly intended to include all such changes, modifications, and variations as fall within the scope and spirit of the following claims.

Now, therefore, we claim:

1. A high speed rotary transfer conveyor for shifting rectangular containers from one line, in which the containers are fed in abutting relationship, to another line without change in their relative orientation with respect to their direction of movement comprising a transfer member rotatably mounted in the path of a first line of containers, a container pocket on said member including a rear pusher arm for insertion between successive containers to separate the first container from the one line and transfer it to a second line, and a shoulder on the member ahead of the pocket engaging a portion of the container and swinging it partially away from the line into a position angularly related thereto to permit insertion of the pusher arm behind it.

2. A conveyor according to claim 1 in which the transfer member is rotatably mounted on an axis laterally offset from the first line of containers.

3. A conveyor according to claim 1 in which the container pocket and rear pusher arm cross the first line of containers at an angle of substantially 45°.

4. A conveyor according to claim 1 having an outer guide substantially concentric with the transfer member.

5. A high speed rotary transfer conveyor for shifting rectangular containers from one line, in which the containers are fed in abutting relationship, to another line without change in their relative orientation with respect to their direction of movement comprising a transfer member rotatably mounted in the path of a first line of containers, a rear pusher arm on said member for insertion between the first and second containers in the line, and means on said member ahead of the pusher arm for engaging a forward portion of the first container and turning it partially away from the line into a position angularly related thereto to permit insertion of the pusher arm behind it.

6. A high speed rotary transfer conveyor for shifting rectangular containers from one line, in which the containers are fed in abutting relationship, to another line without change in their relative orientation with respect to their direction of movement comprising a transfer member rotatably mounted in the path of the first line of containers, a rear pusher arm on said member for insertion between the first and second containers in the line, said arm being movable along a path at least partially crossing said line, shifting means initially engaging and moving the leading end of the first container partially away from the line along the path of movement of the arm, and means holding the rear end of the leading container against such lateral movement, said shifting and holding means thereby positively turning the first container along said path for insertion of said arm behind it.

7. A conveyor according to claim 6 in which the shifting means comprises a shoulder on the transfer member ahead of the pusher arm, and the holding means comprises an external guide substantially concentric with the transfer member, the guide intersecting the outer edge of the first line of containers at a point adjacent the rear portion of the leading container, said point being farther from the axis of rotation of the transfer member than the distance from the axis to the intermediate portion of the guide.

8. A conveyor according to claim 6 in which the shifting means comprises a stationary cam surface in the normal path of a container in said one line and engaged by a leading portion of each container for turning the same, while said holding means engages the rear portion of the container.

9. A conveyor according to claim 6 in which the shifting and holding means comprise cooperating inner and outer guides angularly intersecting the first line of containers, the inner guide lying in the normal path of a container in said one line and swinging the forward inner edge of the leading container out of the path, and the outer guide engaging the rear outer portion of the leading container and providing a pivot around which the container may swing.

10. A high speed rotary transfer conveyor for shifting non-circular containers from a given path without change in their relative orientation with respect to their direction of movement comprising means for feeding the containers in abutting relation along the given path, a transfer member rotatably mounted on a vertical axis laterally offset at one side of the path, a pusher arm on said member movable across said path along a line located forwardly of the rear edge of the leading container in the path when said container is at the end of the path, and means engaging the leading edge of the leading container while the rear end of said container is still in abutting relation with the following container and deflecting said leading edge outwardly from the path on the side opposite said axis and thereby turning the container to an angular position in which one edge of said rear end is spaced from the following container and located within the line of movement of the pusher arm, said engaging and deflecting means being operatively effective in timed relation before said arm crosses said path.

11. A high speed rotary transfer conveyor for shifting non-circular containers from a given path without change in their relative orientation with respect to their direction of movement comprising means for feeding the containers along the given path in abutting relation, a transfer member rotatably mounted on a vertical axis laterally offset at one side of the path, an inner guide having a portion intersecting the path at an obtuse angle and extending at least partially across the path from the side near said axis, and a pusher arm on the transfer member movable across said path along an arc located forwardly of the rear edge of the leading container in the path when said container is at the end of the path, said inner guide portion engaging the forward edge of the leading container while the rear end of said container is still in abutting relation with the following container and thereby turning the container in response to further movement of the container by the feeding means to an angular position in which one edge of said rear end is spaced from said following container and located within the line of movement of the pusher arm, before said arm crosses said path.

References Cited in the file of this patent

UNITED STATES PATENTS

| Number | Name | Date |
|---|---|---|
| 1,245,730 | Johnson et al. | Nov. 6, 1917 |
| 1,278,274 | Winkley | Sept. 10, 1918 |
| 1,828,624 | Sedwick | Oct. 20, 1931 |
| 1,924,146 | Almgren | Aug. 29, 1933 |
| 2,258,185 | Lyon | Oct. 7, 1941 |
| 2,365,304 | Stewart | Dec. 19, 1944 |